US011340864B2

(12) United States Patent
Silverstein et al.

(10) Patent No.: US 11,340,864 B2
(45) Date of Patent: May 24, 2022

(54) COMMUNICATION DEVICE AUDIO TRANSMISSION MODIFICATION

(71) Applicant: International Business Machines Corporation, Armonk, NY (US)

(72) Inventors: Zachary A. Silverstein, Jacksonville, FL (US); Spencer Thomas Reynolds, Austin, TX (US); Jeremy R. Fox, Georgetown, TX (US); Jacob Ryan Jepperson, St. Paul, MN (US)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 16/990,002

(22) Filed: Aug. 11, 2020

(65) Prior Publication Data

US 2022/0050657 A1    Feb. 17, 2022

(51) Int. Cl.
*G06F 3/16* (2006.01)
*G10L 25/51* (2013.01)
*H04R 3/00* (2006.01)
*H04M 3/56* (2006.01)

(52) U.S. Cl.
CPC .............. *G06F 3/165* (2013.01); *G10L 25/51* (2013.01); *H04R 3/00* (2013.01); *H04M 3/568* (2013.01)

(58) Field of Classification Search
CPC ........ G06F 3/165; G06F 3/167; G06F 1/1605; G06F 3/16; G06F 1/163; G10L 25/51; H04R 3/00; H04R 2420/07; H04R 1/1041; H04R 3/005; H04R 3/12; H04R 5/033; H04R 1/1008; H04R 1/028; H04R 1/1016;
(Continued)

(56) References Cited

U.S. PATENT DOCUMENTS 7,843,486 B1   11/2010   Blair et al.
7,869,425 B2 *   1/2011   Elliott ................ H04L 12/1403
                                                    709/228
(Continued)

FOREIGN PATENT DOCUMENTS

CN          104111814 A      10/2014
WO      2014027190 A1       2/2014

OTHER PUBLICATIONS

Unknown, "Frost & Sullivan", printed Dec. 29, 2019, 6 pages <www.frost.com>.
(Continued)

*Primary Examiner* — Akelaw Teshale
(74) *Attorney, Agent, or Firm* — Stosch Sabo

(57) ABSTRACT

A method can include obtaining audio data corresponding to a user of a communication device. The communication device can be configured to transmit the audio data. The method can further include obtaining proximity data indicating a user distance between the user and the communication device. The method can further include determining that the user distance exceeds a threshold distance. The method can further include determining, based at least in part on the audio data, an activity status of the user. The method can further include determining that the activity status is an inactive status. The method can further include modifying, in response to the determining that the threshold distance is exceeded and that the activity status is the inactive status, a transmission of the audio data from the communication device.

20 Claims, 7 Drawing Sheets

(58) Field of Classification Search
CPC ...... H04R 27/00; H04R 2499/11; H04R 1/10;
H04R 1/1025; H04R 1/105; H04R
1/1083; H04R 1/406; H04R 2201/401;
H04R 2430/21; H04R 2430/23; H04R
2460/13; H04R 3/02; H04R 3/04; H04R
5/02; H04R 5/04; H04R 1/02; H04R
1/026; H04R 1/1075; H04R 1/22; H04R
1/24; H04R 1/245; H04R 1/26; H04R
1/28; H04R 1/2803; H04R 1/2807; H04R
1/2842; H04R 1/2857; H04R 1/2896;
H04R 1/34; H04R 1/342; H04R 1/345;
H04R 1/347; H04R 1/38; H04R 1/44;
H04R 2201/103; H04R 2225/43; H04R
2227/003; H04R 2410/05; H04R 2430/01;
H04R 2430/03; H04R 2460/07; H04R
25/70; H04R 29/001; H04R 5/0335;
H04R 9/06; H04R 1/1091; H04R
2225/39; H04R 2227/005; H04R 2420/01;
H04R 2460/01; H04R 2499/15; H04R
25/505; H04R 25/606; H04R 31/00;
H04R 5/027; H04R 9/066; H04R 11/02;
H04R 17/00; H04R 1/00; H04R 1/04;
H04R 1/08; H04R 1/083; H04R 1/1033;
H04R 1/1058; H04R 1/2811; H04R
1/2849; H04R 1/2876; H04R 1/288;
H04R 1/326; H04R 1/403; H04R
2201/107; H04R 2201/403; H04R
2225/41; H04R 2225/55; H04R 2227/001;
H04R 2227/009; H04R 2400/01; H04R
2400/03; H04R 2410/01; H04R 2410/07;
H04R 2430/25; H04R 2499/13; H04R
25/305; H04R 25/43; H04R 25/507;
H04R 25/554; H04R 25/558; H04R
29/00; H04R 29/002; H04R 29/005;
H04R 29/007; H04R 9/02; H04R 9/025;
H04R 9/063; H04M 3/568; H04M
1/72412; H04M 1/72454; H04M 1/72457;
H04M 1/605; H04M 1/60; H04M
2203/2094; H04M 2242/22
See application file for complete search history.

(56) References Cited

U.S. PATENT DOCUMENTS

| | | | |
|---|---|---|---|
| 7,920,932 B2* | 4/2011 | Igoe | G10H 1/08 |
| | | | 725/80 |
| 9,386,147 B2* | 7/2016 | McDysan | H04M 3/568 |
| 9,392,088 B2 | 7/2016 | Strazisar et al. | |
| 9,462,437 B2 | 10/2016 | Uusitalo et al. | |
| 10,120,644 B2 | 11/2018 | Robbins et al. | |
| 10,334,362 B2* | 6/2019 | Dickins | G10L 21/0232 |
| 10,531,157 B1* | 1/2020 | Loritsch | H04N 21/42203 |
| 2006/0212147 A1* | 9/2006 | McGrath | H04M 3/56 |
| | | | 381/17 |
| 2012/0020487 A1* | 1/2012 | Fried | H04M 1/72415 |
| | | | 381/105 |
| 2012/0062729 A1* | 3/2012 | Hart | H04N 7/142 |
| | | | 348/135 |
| 2013/0028443 A1* | 1/2013 | Pance | G06F 3/0484 |
| | | | 381/107 |
| 2013/0029649 A1* | 1/2013 | Hanson | H04M 3/4285 |
| | | | 379/202.01 |
| 2014/0295811 A1* | 10/2014 | Uusitalo | H04W 4/027 |
| | | | 455/416 |
| 2015/0055770 A1* | 2/2015 | Spittle | H04M 3/568 |
| | | | 379/202.01 |
| 2016/0055859 A1 | 2/2016 | Finlow-Bates et al. | |
| 2018/0325469 A1* | 11/2018 | Fountaine | G06F 3/167 |
| 2019/0173446 A1* | 6/2019 | Knode | H04R 3/00 |
| 2020/0382336 A1* | 12/2020 | Xie | H04L 12/12 |

OTHER PUBLICATIONS

Unknown, "Glance", printed Dec. 29, 2019, 2 pages <www.glance.net>.

Unknown, "Cisco Webex", printed Dec. 29, 2019, 9 pages <www.webex.com>.

Unknown, "GoToMeeting", Dec. 29, 2019, 7 pages <www.gotomeeting.com>.

Unknown, "Web Conferencing Market Expected To Grow at a Noticeable CAGR of 11.34% During 2019-2025", Apr. 26, 2019, 3 pages <https://www.marketwatch.com/press-release/web-conferencing-market-expected-to-grow-at-a-noticeable-cagr-of-1134-during-2019-2025-2019-04-26>.

White, J., "Ineffective Meetings Cost Companies Up to $283 Billion a Year (So Streamline Collaboration With These Tips)", Inc., printed Jun. 18, 2020, 13 pages.

Mell et al., "The NIST Definition of Cloud Computing", Recommendations of the National Institute of Standards and Technology, Sep. 2011, 7 pages.

Silverstein et al., "Communication Device Audio Transmission Modification", U.S. Appl. No. 16/990,013, filed Aug. 11, 2020.

IBM, List of IBM Patents or Patent Applications Treated as Related, Aug. 10, 2020, 2 pages.

* cited by examiner

COMMUNICATION DEVICE AUDIO TRANSMISSION MODIFICATION

BACKGROUND

The present disclosure relates to a transmission of audio data from a communication device, and more specifically, to modification of a transmission of audio data from a communication device.

A communication device, such as a conferencing telephone or a telephone having speakerphone functionality, can broadcast audio data (e.g., speech) from a second location to a first environment where the communication device is located. Additionally, such a communication device can obtain audio data from the first environment and transmit the audio data to the second location. In some instances, such a communication device can be configured to increase and/or decrease a volume corresponding to the audio data transmitted from the first environment to the second location. In some instances, such a communication device can be configured to be muted, such that the transmission of audio data from the first environment to the second location is stopped.

SUMMARY

According to embodiments of the present disclosure, a method can include obtaining audio data. The audio data can correspond to a user of a communication device. The communication device can be configured to transmit the audio data. The method can further include obtaining proximity data. The proximity data can indicate a user distance between the user and the communication device. The method can further include determining that the user distance exceeds a threshold distance. The method can further include determining, based at least in part on the audio data, an activity status of the user. The method can further include determining that the activity status is an inactive status. The method can further include modifying, in response to the determining that the threshold distance is exceeded and that the activity status is the inactive status, a transmission of the audio data from the communication device.

A system and a computer program product corresponding to the above method are also included herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
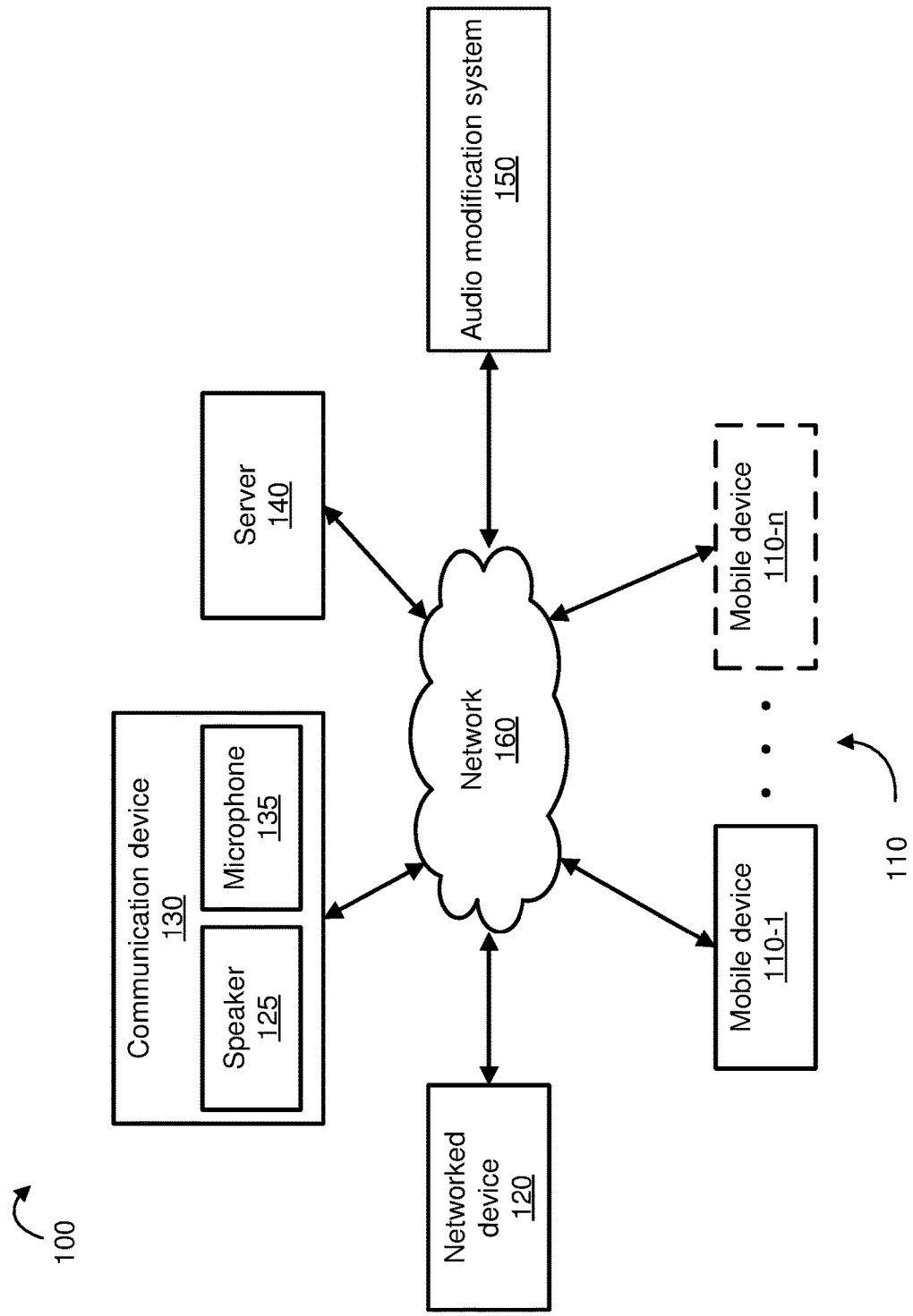
FIG. 1 depicts an example computing environment having an audio modification system, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to the transmission of audio data from a communication device; more particular aspects relate to modification of a transmission of audio data from a communication device. While the present disclosure is not necessarily limited to such applications, various aspects of the disclosure may be appreciated through a discussion of various examples using this context.

A communication device, such as a conferencing telephone or a telephone having speakerphone functionality, can broadcast audio data (e.g., speech) from a second location to a first environment where the communication device is located. Additionally, such a communication device can obtain audio data from the first environment and transmit the audio data to the second location. In some instances, such a communication device can be configured to increase and/or decrease a volume corresponding to the audio data transmitted from the first environment to the second location. In some instances, such a communication device can be configured to be muted, such that the transmission of audio data from the first environment to the second location is stopped.

In some instances, an environment where a communication device is located (i.e., a "communication device environment") can include an office or meeting room of a commercial facility, such as an office building. In some instances, a communication device environment can include a residential structure, such as a house or a condominium, where a user of a communication device resides. On occasion, the communication device can obtain audio data that the user does not desire the communication device to transmit from the environment. Such audio data can be unanticipated and can interfere with communication activities, such as conference telephone calls, in which the user participates.

For example, a user can employ a communication device to participate in a business conference telephone call with multiple remotely-located coworkers. The user and the communication device can be located in a home office space of the user's home. Additionally, the communication device can operate as a speakerphone, such that the communication device can obtain sounds from a vicinity of the communication device (e.g., a region that includes the home office space) and transmit those sounds to the remotely-located coworkers. Continuing with this example, during the conference call, the user can decide to make a brief trip downstairs to get a glass of water. While downstairs, an infant in a bedroom of the home can be awakened and begin crying. The crying can be loud enough for the communication device to obtain the sound and transmit it to the multiple coworkers. Furthermore, the crying sound can cause a distraction in the business conference telephone call until the user returns to the home office space and activates a mute function of the communication device. Such a mute function can stop the transmission of sound from the communication device to the multiple coworkers.

In another example, continuing with the user and the communication device configuration discussed above, the user can be speaking to multiple coworkers using the communication device. While the user is speaking, a mail delivery person can approach the front door of the user's home. In response, the user's dog, recognizing that someone is at the front door, can begin barking. The barking sound can be louder than the user's voice and can be transmitted by the communication device to the multiple coworkers. Thus, the barking sound can interrupt the business conference telephone call until the user activates the mute function.

To address these and other challenges, embodiments of the present disclosure include an audio modification system. In some embodiments, the audio modification system can autonomously modify a transmission of audio data from a communication device (e.g., activate a mute function of the communication device) based, at least in part, on a user's proximity to the communication device. In some embodiments, the audio modification system can autonomously modify a transmission of audio data from a communication device based, at least in part, on a potential disruption to use of the communication device. In some embodiments, the audio modification system can notify a communication device user of a potential disruption to use of the communication device, so that the user can determine if and/or when to modify a transmission of audio data from the communication device. Accordingly, embodiments of the present disclosure can implement one or more dynamic, proactive operations to avoid one or more undesired audio data transmissions from a communication device. Thus, embodiments of the present disclosure can aid in reducing disruptions that can occur during the use of communication devices.

For example, in the "crying sound" example discussed above, embodiments of the present disclosure can determine when a user is not actively participating in a conference call (e.g., when the user is not speaking) and when the user's distance from the communication device exceeds a threshold (e.g., when the user goes downstairs). In response, embodiments of the present disclosure can autonomously activate a mute function of the communication device to avoid potential transmissions of disruptive audio data.

In another example, in the "barking sound" example discussed above, embodiments of the present disclosure can identify a potential audio disruption (e.g., the mail delivery person approaching the front door) based on data such as images from a networked camera at the front door. Embodiments of the present disclosure can additionally determine when the user is actively participating in a conference call by analyzing the user's speech. In the example discussed above, since the user is actively participating in the conference call, embodiments of the present disclosure can display a notification to the user indicating the presence of the mail delivery person. Based on the notification, the user can excuse himself or herself from the conference call and activate a mute function of the communication device to avoid the forthcoming audio disruption. Additionally, in an otherwise identical scenario in which the user is not actively participating in the conference call, embodiments of the present disclosure can autonomously activate the mute function of the communication device and notify the user of the modification.

Turning to the figures, FIG. 1 illustrates a computing environment 100 that includes one or more of each of an audio modification system ("AMS") 150, a networked device 120, a communication device 130, a server 140, and a network 160. The computing environment 100 also includes a set of mobile devices 110. The set of mobile devices 110 can include one or more mobile devices. For example, in some embodiments, the set of mobile devices 110 can include n mobile devices, where n is an integer greater than zero. For example, n=1 in embodiments in which the set of mobile devices 110 includes only a first mobile device 110-1; n=2 in embodiments in which the set of mobile devices 110 includes two mobile devices (a first mobile device 110-1 and a second mobile device 110-2); and so on.

In some embodiments, at least one AMS 150, networked device 120, communication device 130, server 140, and/or mobile device 110-$n$ can obtain and store data, such as activity data and/or proximity data (discussed below). In some embodiments, at least one AMS 150, networked device 120, communication device 130, server 140, and/or mobile device 110-$n$ can exchange data with at least one other through the at least one network 160. For example, in some embodiments, at least one AMS 150, networked device 120, communication device 130, server 140, and/or mobile device 110-$n$ can exchange activity data and/or proximity data with at least one other through the at least one network 160. One or more of each of the AMS 150, networked device 120, communication device 130, server 140, mobile device 110-$n$ and/or network 160 can include a computer system, such as the computer system 501 discussed with respect to FIG. 5.

In some embodiments, the AMS 150 can be a software application installed on a computer system of at least one of the networked device 120, communication device 130, server 140, and/or mobile device 110-$n$. In some embodiments, the AMS 150 can be integrated into one or more software applications installed on at least one of the networked device 120, communication device 130, server 140, and/or mobile device 110-$n$. For example, in some embodiments, the AMS 150 can be included as a plug-in software component of a software application (e.g., a conference-call software application) installed on the communication device 130. The AMS 150 can include program instructions implemented by a processor, such as a processor of the communication device 130, to perform one or more operations discussed with respect to FIG. 3 and/or FIG. 4. In some embodiments, the AMS 150 can be identical or substantially similar to the AMS 230 discussed with respect to FIG. 2.

In some embodiments, communication device 130 can be a device configured to obtain and transmit audio data (e.g., sounds, such as speech) and to receive and emit audio data. For example, in some embodiments, a communication device 130 can include a telephone and/or teleconferencing equipment. In some embodiments, a communication device 130 can include a computer, such as a tablet computer, desktop computer, and/or notebook computer. In some embodiments, the communication device 130 can include a microphone 135 configured to obtain audio data and a speaker 125 configured to emit audio data. For example, in some embodiments, the communication device 130 can include a notebook computer having a microphone 135 and a speaker 125. In this example, the notebook computer can implement a conference-call software application that allows a user to participate in a conference call using the notebook computer. Further in this example, the AMS 150 can be included as a plug-in software component of the conference-call software.

In some embodiments, the set of mobile devices 110 can include one or more devices such as a mobile phone, wearable technology (e.g., smart watch and/or fitness tracker), and/or computer (e.g., tablet computer and/or notebook computer). In some embodiments, the set of mobile devices 110 can be configured to present to a user a visual and/or an audible notification from the AMS 150. For example, in some embodiments, a mobile device 110-*n* can include a display (not shown) and/or a speaker (not shown) configured, respectively, to present an alphanumeric notification and/or an automated speech notification from the AMS 150 to the user.

In some embodiments, a networked device 120 can include a device that can be connected to one or more networks and configured to communicate with one or more electronic devices. For example, networked devices 120 can include Internet of things ("IoT") devices, such as cameras, televisions and/or monitors, sensors, and/or wireless transmitters (e.g., beacon technology beacons).

In some embodiments, server 140 can be a web server accessible by one or more of each of the AMS 150, networked device 120, communication device 130, and/or mobile device 110-*n* through the network 160. In some embodiments, the network 160 can be a wide area network (WAN), a local area network (LAN), the internet, or an intranet. In some embodiments, the network 160 can be substantially similar to, or the same as, cloud computing environment 50 discussed with respect to FIG. 6.

Figure 2:
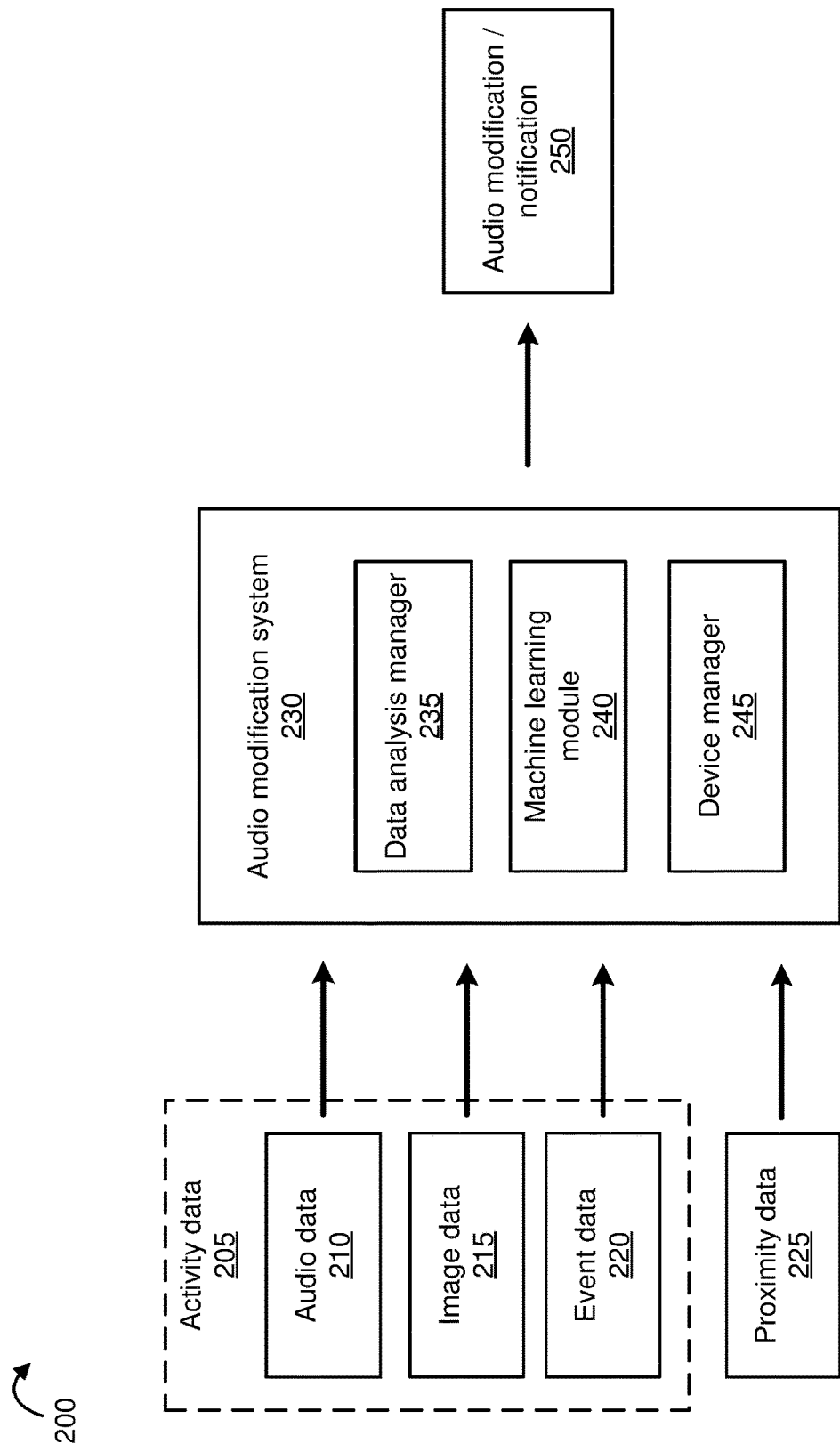
FIG. 2 depicts an example data flow diagram of an audio modification system, in accordance with embodiments of the present disclosure.

FIG. 2 illustrates an example data flow diagram 200 of an AMS 230, in accordance with embodiments of the present disclosure. In the data flow diagram 200, the AMS 230 can obtain activity data 205 and/or proximity data 225 and can output an audio modification decision and corresponding notification 250.

In some embodiments, the AMS 230 can be identical or substantially similar to the AMS 150 discussed with respect to FIG. 1. In some embodiments, the AMS 230 can include one or more modules, such as a data analysis manager 235, a machine learning module 240, and/or a device manager 245 (discussed further below). In some embodiments, one or more of the AMS 230, the data analysis manager 235, machine learning module 240, and/or device manager 245 can include program instructions implemented by a processor, such as processor 510, FIG. 5, to perform one or more operations discussed with respect to FIG. 3 and/or FIG. 4. In some embodiments, one or more of the data analysis manager 235, machine learning module 240, and/or device manager 245 can be integrated into a single module.

In some embodiments, activity data 205 can include information corresponding to a communication device environment. For example, in some embodiments, activity data 205 can include information corresponding to sounds, images, entities, and/or actions, that can affect a room or space where a communication device is located. The audio modification system 230 can obtain activity data 205 from one or more sources, such as one or more mobile devices, networked devices, communication devices, and/or servers (e.g., mobile devices 110, networked devices 120, communication devices 130, and/or servers 140, FIG. 1). In some embodiments, activity data 205 can include one or more of audio data 210, image data 215, and/or event data 220.

In some embodiments, audio data 210 can include data corresponding to sounds, such as speech and/or ambient noises, that are audible in a communication device environment. For example, in some embodiments, a communication device can include a microphone (e.g., microphone 135, FIG. 1). The microphone can be configured to convert received sounds (e.g., sound waves) into a corresponding electrical signal. In this example, audio data 210 can include the electrical signal corresponding to the sound waves received by the microphone. In some embodiments, audio data 210 can include one or more of user voice data (e.g., a sound of a voice of a user of a communication device); third-party voice data (e.g., a sound of a voice other than a user's voice); and/or ambient noises (e.g., sounds in the communication device environment).

For example, in some embodiments, a user can participate in a telephone call with a second party using a communication device. In this example, the user and the communication device can be located in the user's office. Additionally in this example, the communication device can function as a speakerphone. For example, a speaker of the communication device can broadcast sounds from the second party's location to a vicinity of the communication device, and a microphone of the communication device can receive sounds from the vicinity of the communication device. Additionally, the communication device can transmit the received sounds to the second party's location. Continuing with this example, user voice data can include the sound of the user speaking to the second party through the communication device. Additionally in this example, third-party voice data can include the sound of the user's coworker entering the user's office and speaking to the user about a topic unrelated to the topic of the telephone call. Additionally in this example, ambient noises can include sounds such as a telephone ringing in an adjacent office, a vacuum cleaner being used in a hallway, and the user typing on the user's computer. In some embodiments, audio data 210 can include sounds such as a clock chime, a passing train, an overhead airplane, a siren, a doorbell, a barking dog, and the like. In some embodiments, audio data 210 can include times and/or dates corresponding to sounds that are audible in a communication device environment.

In some embodiments, image data 215 can include images corresponding to a communication device environment. In some embodiments, image data 215 can include information about activities inside a communication device environment and/or activities that can affect a communication device environment. For example, in some embodiments, image data 215 can include video data from a networked doorbell camera at a house where a communication device is located. Such video data can indicate when a visitor is about to ring a doorbell, which can affect the communication device environment. In another example, in some embodiments, image data 215 can include images from one or more networked cameras inside an office meeting room where a communication device is located. Such images can indicate activities such as whether a user is typing and/or whether a user has left the meeting room. In some embodiments, image data 215 can include times and/or dates corresponding to images.

In some embodiments, event data 220 can include information about one or more specific actions and/or one or more activities that can be scheduled. In some embodiments, such specific actions and/or activities can affect a communication device environment. For example, in some embodiments, event data 220 can include data from one or more door sensors indicating that a door has been opened. In another example, in some embodiments, event data 220 can include calendar data that the AMS 230 can download from a resource, such as a web server. In some embodiments, such calendar data can include one or more event times (e.g., a time of day corresponding to an occurrence of an event) and/or one or more event dates (e.g., a calendar date corresponding to an occurrence of an event). For example, calendar data can include an email indicating an event time and an event date for an office building fire drill. In another example, such calendar data can include a scheduled communication time. A communication time can refer to a time period and/or date during which the communication device is to be in operation by a user (e.g., an electronic calendar entry indicating a date, time, and duration of a scheduled conference call). In another example, in some embodiments, event data 220 can include one or more scheduled events input into the AMS 230 by a user. For example, in some embodiments, a user's home office can be located near a tornado siren that is tested on a predetermined weekday and time. In this example, the user can input the predetermined weekday and time into the AMS 230 with a mobile device, such as a mobile telephone.

In another example, in some embodiments, event data 220 can include one or more scheduled events generated by the AMS 230. For example, in some embodiments, the AMS 230 can generate one or more scheduled events based on audio data 210 and/or image data 215. For example, in some embodiments, a communication device that includes an AMS 230 can be located within an audible range of a chiming clock. In this example, based on the times and/or dates corresponding to chiming sounds generated by the clock, the AMS 230 can generate one or more scheduled events corresponding to those times and/or dates.

Accordingly, embodiments of the present disclosure can be configured to obtain activity data 205 in a variety of manners and from a plurality of sources. Thus, embodiments of the present disclosure can be configured to obtain comprehensive information about activities that can affect a communication device environment.

In some embodiments, proximity data 225 can include information corresponding to a device distance. A device distance can refer to a distance between one or more mobile devices (e.g., mobile devices 110, FIG. 1) and a communication device (e.g., communication device 130, FIG. 1). In some embodiments, such a device distance can indicate a user distance (i.e., a distance between a communication device user and a communication device). In some embodiments, such a device distance can indicate a third-party distance (i.e., a distance between a third-party (e.g., a person who is not participating in a conference call using the communication device) and the communication device).

For example, in some embodiments, a user can participate in a conference call using a conferencing telephone that includes AMS 230. In this example, the user can have two mobile devices in the user's possession: a mobile telephone in the user's pocket and a smart watch on the user's wrist. Thus, under an assumption that the user maintains such possession of the two mobile devices, a distance between one or both of the mobile devices and the conferencing telephone (i.e., a device distance) can indicate a distance between the user and the conferencing telephone (i.e., a user distance). Similarly, a distance between a mobile telephone carried by a third-party, such as the user's spouse, and the conferencing telephone (i.e., a device distance) can indicate a distance between the third-party and the conferencing telephone (i.e., a third-party distance).

In some embodiments, proximity data 225 can include information that can indicate a user distance and/or a third-party distance. For example, in some embodiments, proximity data can include images of a user standing in a location that is approximately 25 meters (m) from a communication device. Thus, such images can indicate a user distance of approximately 25 m.

In some embodiments, the AMS 230 can obtain proximity data 225 through network communication with one or more of a mobile device, networked device, and/or communication device. For example, in some embodiments, a fitness tracker of a user can transmit information about its location to an AMS 230 included on a communication device through a wireless network connection with the communication device. In this example, the AMS can determine a distance between a location of the communication device and the location of the fitness tracker.

In some embodiments, the AMS 230 can obtain proximity data 225 by analyzing image data 215 and/or audio data 210. For example, in some embodiments, the AMS 230 can obtain images of a user from a networked camera. In this example, the images can indicate that the user is located in a room other than a room where a communication device is located. Thus, such images can indicate to the AMS 230 that the user is located at a distance that exceeds a threshold distance from the communication device.

In some embodiments, the AMS 230 can obtain proximity data 225 through one or more audible sounds generated by a mobile device. For example, in some embodiments, an AMS 230 included on a communication device can issue a command to a mobile telephone of a user through a network connection with the mobile telephone. In this example, the command can cause the mobile telephone to emit one or more audible sounds that can be obtained by a microphone of the communication device. Continuing with this example, based on a sound level (e.g., a decibel value) of the one or more audible sounds obtained by the microphone, the AMS 230 can determine a distance between the mobile telephone and the communication device.

In some embodiments, proximity data 225 can include a numerical value, such as a distance in meters, between a mobile device and a communication device. In some embodiments, proximity data 225 can include an indication of a distance, such as whether a user and/or a mobile device of a user is located outside of a room where a communication device is located.

Turning to the one or more modules that can be included with the AMS 230, in some embodiments, the AMS 230 can include a data analysis manager 235. The data analysis manager 235 can obtain and analyze activity data 205 and/or proximity data 225. For example, in some embodiments, the data analysis manager 235 can include program instructions to perform operations 305-320 and 335, FIG. 3. In some embodiments, the data analysis manager 235 can include program instructions to perform operations 405-425 and 440, FIG. 4. In some embodiments, the data analysis manager 235 can implement technology such as image analysis technology, audio analysis technology, speech recognition technology, and/or natural language processing technology to determine an activity status of a user, identify a potential audio disruption, generate a potential-disruption rating, and/or interpret activity data 205 and/or proximity data 225.

For example, in some embodiments, the data analysis manager 235 can be configured to analyze speech obtained by a communication device. Based on the analysis of the speech, the data analysis manager 235 can determine if the speech is by a user who is scheduled to participate in a conference call, or if the speech is by a third-party who is not scheduled to participate in the conference call. In some embodiments, the data analysis manager 235 can be configured to analyze sound parameters, such as a sound level and/or sound frequency. Additionally, in some embodiments, the data analysis manager 235 can be configured to identify characteristics of sound parameters, such as a recurring pattern of sounds having substantially similar parameters, changes in sound parameters (e.g., an increasing and/or decreasing sound level and/or sound frequency), and/or sounds that exceed a threshold sound level.

In another example, some embodiments, the data analysis manager 235 can be configured to obtain and analyze text compositions, such as email messages and calendar entries, to obtain data such as event data 220.

In some embodiments the data analysis manager 235 can include one or more stored thresholds (e.g., one or more threshold distances, activity thresholds, and/or disruption thresholds). Such one or more stored thresholds can be selected by a user or included as one or more default values in programming instructions of the AMS 230.

In some embodiments, the AMS 230 can include a machine learning module 240. In some embodiments, the machine learning module 240 can include program instructions to perform operations 315 and 320, FIG. 3. In some embodiments, the machine learning module 240 can include program instructions to perform operations 410-425, FIG. 4. In some embodiments, the machine learning module 240 can be a processor that includes a machine learning algorithm. The machine learning algorithm can be generated by performing supervised, unsupervised, or semi-supervised training on a data set. In some embodiments, the machine learning module 240 can apply the machine learning algorithm to activity data 205 and/or proximity data 225 to predict an activity status, a potential-disruption rating, and/or whether a distance between a user and a communication device exceeds a threshold. In some embodiments, the machine learning module 240 can apply the machine learning algorithm to activity data 205 and/or proximity data 225 to predict whether to modify a transmission of audio data from a communication device. In these embodiments, in response to the machine learning module 240 predicting that a transmission of audio data should be modified, the AMS 230 can initiate such a modification by generating a modification command and/or notification 250. In some embodiments, the AMS 230 can obtain user feedback that can be used to train the machine learning module 240.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

In some embodiments, the AMS 230 can include a device manager 245. In some embodiments, the device manager 245 can include program instructions to perform operations 325 and 330, FIG. 3. In some embodiments, the device manager 245 can include program instructions to perform operations 430 and 435, FIG. 4.

In some embodiments, the device manager 245 can manage communication between the AMS 230 and one or more devices, such as mobile devices, networked devices, communication devices, and servers (e.g., mobile devices 110, networked device 120, communication device 130, and/or server 140). In some embodiments, device manager 245 can issue one or more commands to one or more such devices. For example, in some embodiments, the device manager 245 can issue a command to a communication device to modify a transmission of audio data from the communication device. For example, the device manager 245 can issue a command to a communication device to activate a mute function that stops transmission of audio data from the communication device. In another example, the device manager 245 can issue a command to a communication device to reduce the volume of a microphone of the communication device to reduce a sound level of audio data transmitted from the communication device. In some embodiments, the device manager 245 can issue a command to a mobile device to cause the mobile device to emit an audible sound that can be analyzed by the AMS 230.

In some embodiments, the device manager 245 can generate and issue one or more notifications to one or more devices, such as a text notification to a mobile phone of a user indicating that a visitor is approaching the front door of the user's house.

Figure 3:
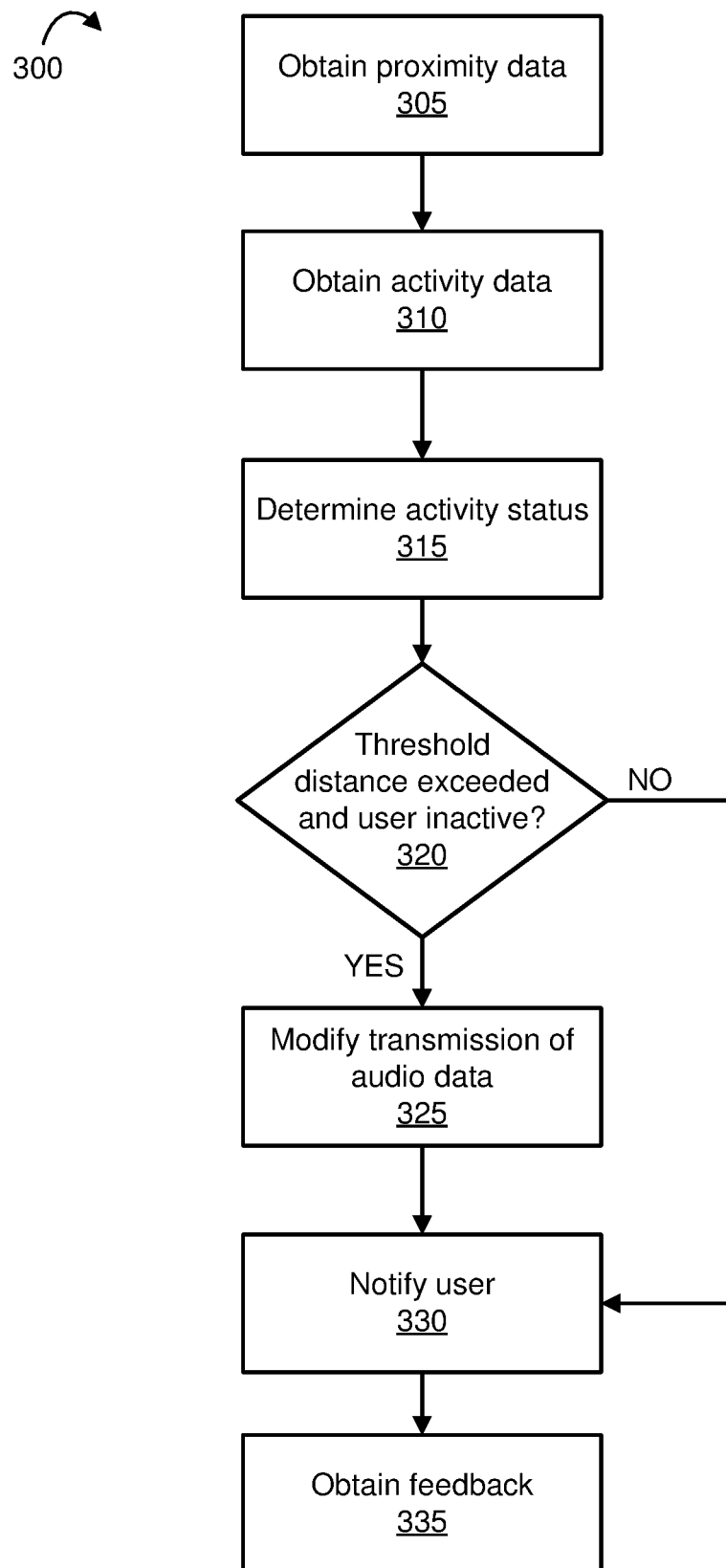
FIG. 3 depicts a flowchart of an example method for modifying a transmission of audio data based, at least in part, on a threshold distance, in accordance with embodiments of the present disclosure.

FIG. 3 illustrates a flowchart of an example method 300 for modifying a transmission of audio data based, at least in part, on a threshold distance, in accordance with embodiments of the present disclosure. The method 300 can be performed by an AMS, such as the AMS 150, FIG. 1 and/or the AMS 230, FIG. 2.

Referring back to FIG. 3, in operation 305, the AMS can obtain proximity data. In some embodiments, the AMS can obtain proximity data from one or more mobile devices, networked devices, and/or communication devices.

In operation 310, the AMS can obtain activity data. In some embodiments, the AMS can obtain activity data from one or more sources, such as one or more mobile devices, networked devices, communication devices, and/or servers.

In some embodiments, in operation 315, the AMS can determine an activity status. An activity status can indicate a degree to which a user is engaged in a use of a communication device. For example, in some embodiments, the AMS can determine that a user has a highest degree of engagement in a use of the communication device when the user is actively speaking to a second party through the communication device. For example, in some embodiments, the AMS can determine such a highest degree of engagement when a user is audibly explaining terms of a contract to a coworker during a conference call using the communication device. In this example, the AMS can determine that the user's activity status is an active status. In another example, in some embodiments, the AMS can determine that a user has a lowest degree of engagement in a use of the communication device when the user does not actively speak to a second party using the communication device for a period of time that exceeds a threshold. For example, the AMS can determine such a lowest degree of engagement when a user is a party to a conference call using the communication device and remains silent for more than 20 minutes. In this example, the AMS can determine that the user's activity status is an inactive status.

In some embodiments, operation 315 can include the AMS generating, based at least in part on activity data obtained in operation 310, an activity rating that corresponds to an activity status of the user. For example, in some embodiments, the AMS can analyze audio data and/or image data to generate a numerical activity rating that can indicate a degree to which a user is engaged in a use of a communication device. For example, the AMS can analyze audio data from the communication device to determine one or more characteristics, such as a characteristic that the user is speaking in intervals (e.g., periods of speech followed by periods of silence) that are consistent with intervals of a back-and-forth dialogue. In this example, the AMS can correlate the characteristic with a numerical activity rating, such as 95%. This numerical activity rating can indicate a 95% certainty that the user's activity status is an active status. In another example, the AMS can analyze audio data from a communication device to determine that a user has remained silent for 15 minutes during a conference call. Further in this example, the AMS can analyze image data from a networked camera to determine that a user is actively typing on a computer. Continuing with this example, based on the audio data and the image data, the AMS can generate an activity rating such as 25%. This numerical activity rating can indicate a 25% certainty that the user's activity status is an active status.

In some embodiments, operation 320 can include the AMS comparing a user distance between a communication device user and the communication device to a threshold distance. Operation 320 can further include the AMS comparing an activity rating to an activity threshold. In some embodiments, if the activity rating exceeds the activity threshold, then the AMS can determine that the user has an active status. In some embodiments, if the activity rating does not exceed the activity threshold, then the AMS can determine that the user has an inactive status. Additionally, in operation 320, if the AMS determines that the user distance exceeds the threshold distance and that the user's activity status is an inactive status, then the AMS can proceed to operation 325. Alternatively, in operation 320 if the AMS determines that the user distance does not exceed the threshold distance or that the user's activity status is an active status, then the AMS can proceed to operation 330.

In operation 325, in response to determining that the user distance exceeds the threshold distance and that the user's activity status is an inactive status, the AMS can modify a transmission of audio data from the communication device. In some embodiments, modifying a transmission of audio data can include stopping a transmission of the audio data from the communication device (e.g., stopping an audio signal from being transmitted across a network from the communication device). In some embodiments, modifying a transmission of audio data can include muting a microphone of the communication device (e.g., deactivating a microphone of the communication device such that it is not operable to convert received sounds into a corresponding electrical signal). In some embodiments, modifying a transmission of audio data can include reducing a volume of the audio data transmitted from the communication device (e.g., decreasing a decibel level of the audio data transmitted from the communication device such that it is below a threshold, such as 5 decibels (dB)).

In operation 330, the AMS can transmit a notification to a user. In some embodiments, the AMS can perform operation 330 in response to determining that the activity status is an active status in operation 320. For example, in some embodiments, the AMS can transmit a text notification to a mobile phone of a user who the AMS determines to have an active status and to have a user distance that exceeds the threshold distance. In this example, the notification can indicate to the user that the user is beyond a threshold distance from the communication device. The notification can further indicate to the user that the mute function of the communication device is not activated.

In some embodiments, operation 330 can include the AMS transmitting a notification to one or more mobile devices that can have one or more respective device distances. For example, as discussed in an example above, in some embodiments, a user can participate in a conference call using a conferencing telephone that includes an AMS. In this example, the user can have two mobile devices in the user's possession: a mobile telephone and a smart watch. Continuing with this example, the user can exit a room where the communication device is located. The user can leave the mobile telephone in the room, but take the smart watch from the room. Thus, a device distance of the mobile telephone obtained by the AMS can be within a threshold distance, and a device distance obtained by the AMS of the smart watch can exceed the threshold distance. Accordingly, in this example, the device distance of the mobile telephone can indicate to the AMS that the user distance is within the threshold distance, and the device distance of the smart watch can indicate to the AMS that the user distance exceeds the threshold distance. Therefore, in some embodiments, the AMS can transmit a notification to the mobile device (i.e., the smart watch) having the device distance that exceeds the threshold distance. In this way, the AMS can be configured to accurately transmit a notification to a user.

In operation 335, the AMS can obtain feedback from a user. In some embodiments, such feedback can include information such as a verification of a user's location, a verification of a user's activity status, and/or whether the user agrees with an audio modification decision of the AMS.

Figure 4:
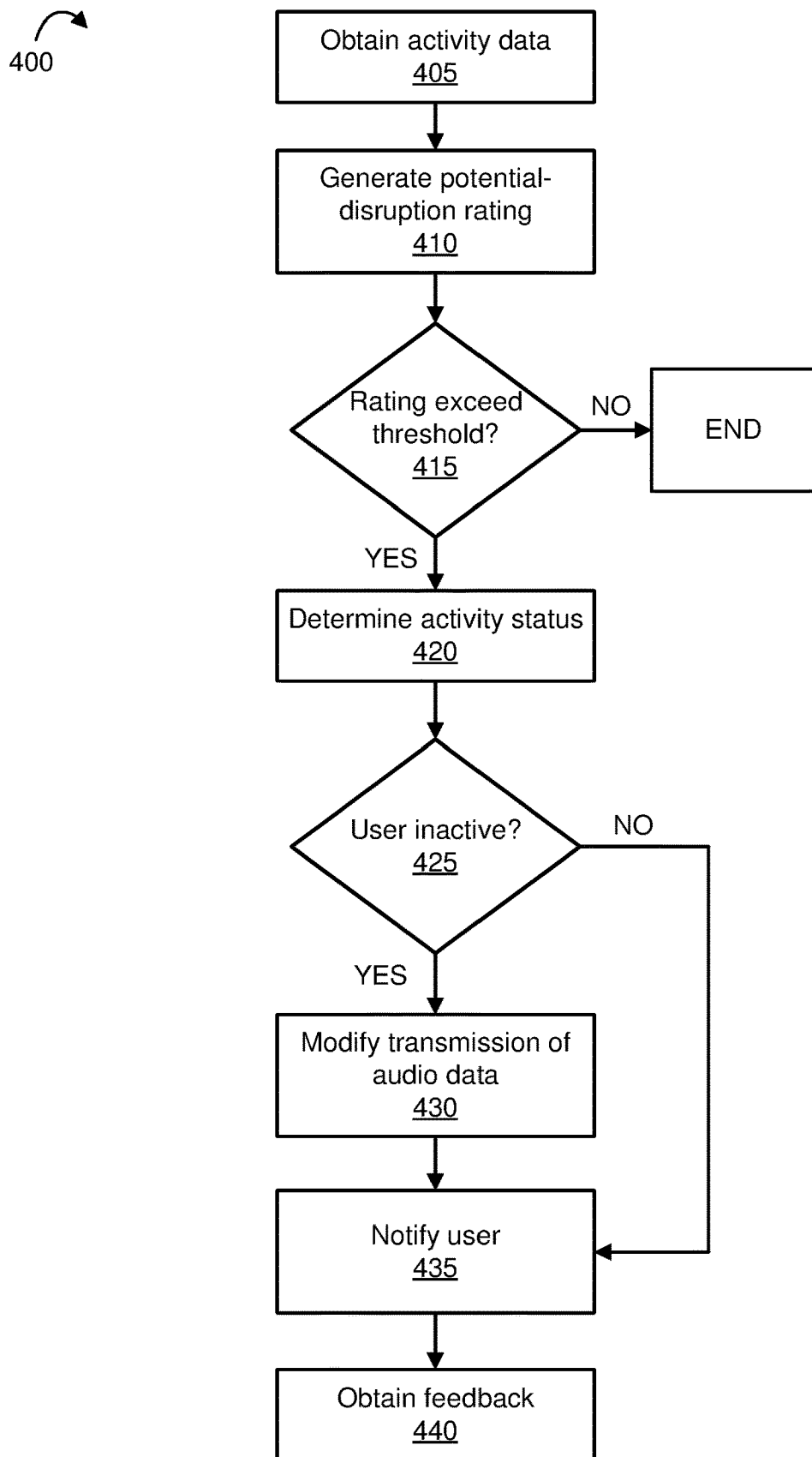
FIG. 4 depicts a flowchart of an example method for modifying a transmission of audio data based, at least in part, on a potential audio disruption, in accordance with embodiments of the present disclosure.

FIG. 4 illustrates a flowchart of an example method 400 for modifying a transmission of audio data based, at least in part, on a potential audio disruption, in accordance with embodiments of the present disclosure. The method 400 can be performed by an AMS, such as the AMS 150, FIG. 1 and/or the AMS 230, FIG. 2.

Referring back to FIG. 4, in operation 405, the AMS can obtain activity data. In some embodiments, the AMS can obtain activity data from one or more sources, such as one or more mobile devices, networked devices, communication devices, and/or servers. In some embodiments, operation 405 can include the AMS obtaining proximity data from one or more mobile devices, networked devices, and/or communication devices.

In operation 410, the AMS can identify, based at least in part on the activity data, a potential audio disruption. A potential audio disruption can include one or more activities that can generate audio data that can interfere with use of a communication device. For example, in some embodiments, a potential audio disruption can include activities such as a chiming clock, a guest approaching a house, a visitor opening a meeting room door, a barking dog, a starting of a vacuum cleaner, and/or a passage of a vehicle such as a truck, airplane, and/or train. In some embodiments, the AMS can identify such potential audio disruptions by analyzing activity data obtained in operation 405.

In some embodiments, identifying a potential audio disruption can include the AMS analyzing proximity data indicating a third-party distance between a third-party and the communication device, and determining that the third-party distance does not exceed a threshold distance. For example, in some embodiments, a user can employ a communication device that includes an AMS. The communication device can be located in the user's home office. Continuing with this example, the AMS can obtain proximity data from a smart watch worn by a third-party (e.g., the user's child). The proximity data can include a device distance of the smart watch that indicates a third-party distance of the user's child. Continuing with this example, when the AMS determines that the third-party distance of the user's child does not exceed a threshold distance, the AMS can identify a potential audio disruption. For example, if a threshold distance is a distance from the communication device to an area just outside the user's home office (e.g., 2 m outside a door of the user's home office), and the AMS obtains proximity data indicating a third-party distance of approximately 1 m outside the door of the user's home office, then the AMS can identify a potential audio disruption.

In some embodiments, identifying a potential audio disruption can include the AMS determining that an event time coincides with a communication time. For example, in some embodiments, a user can be participating in a conference call at the user's office using a communication device that includes an AMS. Continuing with this example, the conference call can be scheduled for 1 PM to 3 PM that day. Continuing with this example, the user can receive an e-mail message at 1:30 PM reminding the user that an office public address system will be tested from 2:30 PM to 2:35 PM that day. In this example, the AMS can obtain the communication time for the conference call and the e-mail message from a web server. Further in this example, the AMS can implement natural language processing technology to interpret the email message. Additionally in this example, the AMS can compare the communication time to the event time for the office public address system test. Based on the comparison, the AMS can determine that the event time coincides with the communication time; thus, the AMS can identify the office public address system test as a potential audio disruption.

In some embodiments, operation 410 can include the AMS generating a potential-disruption rating. A potential-disruption rating can indicate a likelihood that an activity is generating or can generate one or more sounds that can interfere with use of a communication device. In some embodiments, a potential-disruption rating can include a label, such as "high" or "low." In some embodiments, a potential-disruption rating can include a numerical value.

For example, in some embodiments, a potential-disruption rating can have a value of 1, 2, or 3. In this example, a potential-disruption rating of "1" can indicate a lowest likelihood of disruption, and a potential-disruption rating of "3" can indicate a highest likelihood of disruption. For example, an ambient sound having a sound level of 40 dB or less can have a potential-disruption rating of "1" due to that sound level being unlikely to interfere with use of the communication device. In another example, an ambient sound having a sound level of 70 dB or more can have a potential-disruption rating of "3" due to that sound level being highly likely to interfere with use of the communication device (e.g., the sound level can impede one or more party's ability to interpret speech by other parties to a phone call).

In some embodiments, one or more potential-disruption ratings for one or more respective activities can be selected by a user. In some embodiments, the AMS can predict one or more potential-disruption ratings for one or more activities by applying a machine learning algorithm, as discussed with respect to FIG. 2.

In operation 415, the AMS can compare the potential-disruption rating to a disruption threshold. In some embodiments, if the potential-disruption rating does not exceed the disruption threshold, then method 400 can end. Alternatively, in some embodiments, if the potential-disruption rating exceeds the disruption threshold, then the AMS can proceed to operation 420.

In operation 420, the AMS can determine, based at least in part on the activity data, an activity status of the user. In some embodiments, operation 420 can be substantially similar to operation 315, FIG. 3.

In operation 425, the AMS can determine whether the activity status of the user is an inactive status. In some embodiments, if the activity status is an inactive status, then the AMS can proceed to operation 430. Alternatively, in some embodiments, if the activity status is an active status, then the AMS can proceed to operation 435.

In operation 430, the AMS can modify a transmission of audio data from the communication device. In some embodiments, operation 430 can be substantially similar to operation 325, FIG. 3. In some embodiments, operation 430 can include the AMS modifying a transmission of audio data at an event time and/or date. For example, continuing with the "public address system test" example discussed above, if the AMS determines that the user is inactive at 2:30 PM, then the AMS can autonomously activate a mute function of the communication device. In this way, the AMS can autonomously prevent sounds from the public address system test from interfering with the conference call.

In operation 435, the AMS can transmit a notification to the user. In some embodiments, the AMS can perform operation 435 in response to determining that the activity status is an active status in operation 425. For example, continuing with the "public address system test" example discussed above, if the AMS determines that the user has an active status, then the AMS can transmit a text notification regarding the public address system test to a networked television in the user's office. Based on the notification, the user can complete and end the conference call or excuse himself or herself from the conference call and activate a mute function of the communication device. In this way, the user can determine, according to the user's needs, how and/or when to modify a transmission of audio data from the communication device. In some embodiments, operation 435 can be substantially similar to operation 330, FIG. 3.

In operation 440, the AMS can obtain feedback from a user. In some embodiments, operation 440 can be substantially similar to operation 335, FIG. 3.

Figure 5:
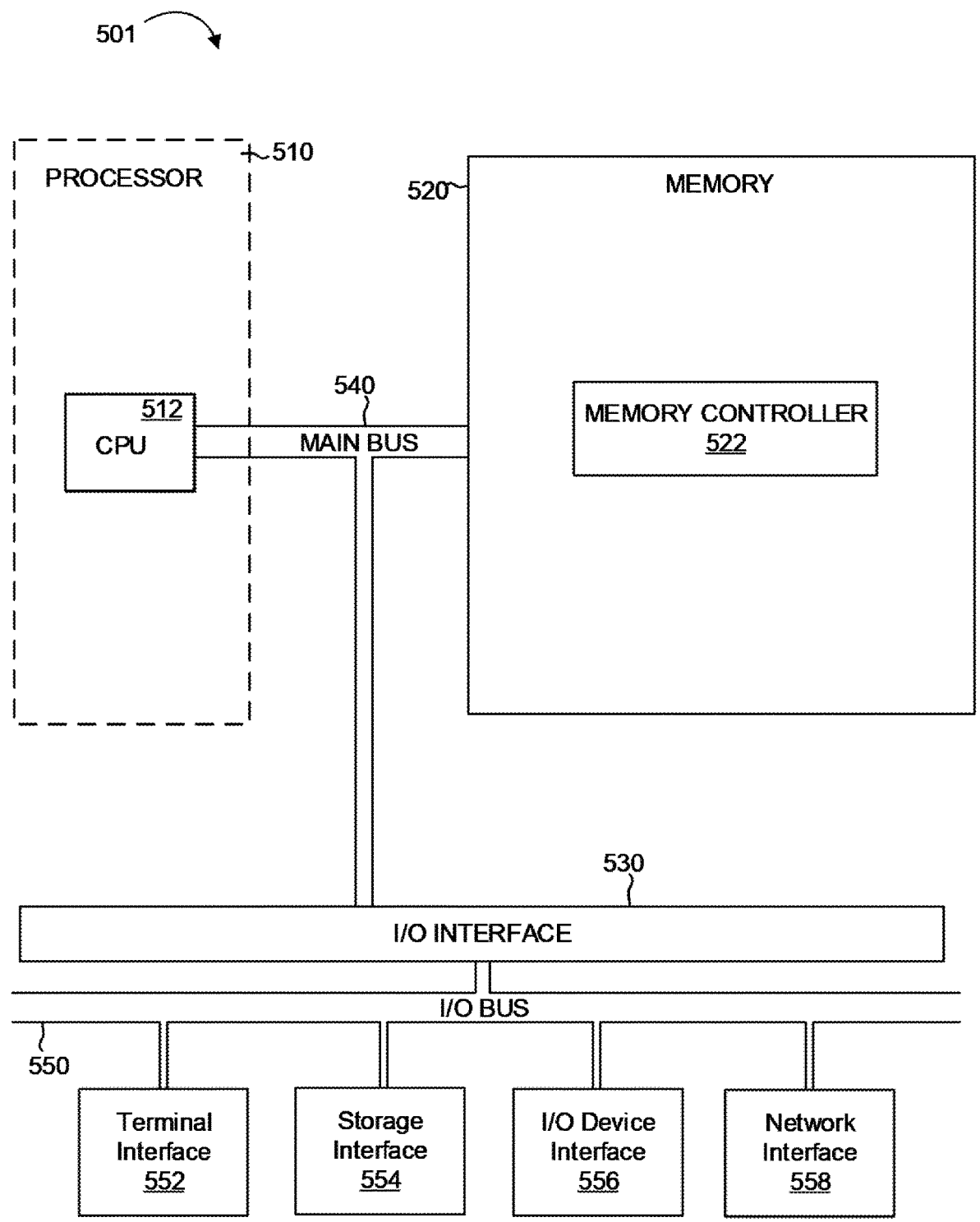
FIG. 5 depicts the representative major components of a computer system that can be used in accordance with embodiments of the present disclosure.

FIG. 5 depicts the representative major components of an exemplary Computer System 501 that can be used in accordance with embodiments of the present disclosure. The particular components depicted are presented for the purpose of example only and are not necessarily the only such variations. The Computer System 501 can comprise a Processor 510, Memory 520, an Input/Output Interface (also referred to herein as I/O or I/O Interface) 530, and a Main Bus 540. The Main Bus 540 can provide communication pathways for the other components of the Computer System 501. In some embodiments, the Main Bus 540 can connect to other components such as a specialized digital signal processor (not depicted).

The Processor 510 of the Computer System 501 can be comprised of one or more CPUs 512. The Processor 510 can additionally be comprised of one or more memory buffers or caches (not depicted) that provide temporary storage of instructions and data for the CPU 512. The CPU 512 can perform instructions on input provided from the caches or from the Memory 520 and output the result to caches or the Memory 520. The CPU 512 can be comprised of one or more circuits configured to perform one or methods consistent with embodiments of the present disclosure. In some embodiments, the Computer System 501 can contain multiple Processors 510 typical of a relatively large system. In other embodiments, however, the Computer System 501 can be a single processor with a singular CPU 512.

The Memory 520 of the Computer System 501 can be comprised of a Memory Controller 522 and one or more memory modules for temporarily or permanently storing data (not depicted). In some embodiments, the Memory 520 can comprise a random-access semiconductor memory, storage device, or storage medium (either volatile or non-volatile) for storing data and programs. The Memory Controller 522 can communicate with the Processor 510, facilitating storage and retrieval of information in the memory modules. The Memory Controller 522 can communicate with the I/O Interface 530, facilitating storage and retrieval of input or output in the memory modules. In some embodiments, the memory modules can be dual in-line memory modules.

The I/O Interface 530 can comprise an I/O Bus 550, a Terminal Interface 552, a Storage Interface 554, an I/O Device Interface 556, and a Network Interface 558. The I/O Interface 530 can connect the Main Bus 540 to the I/O Bus 550. The I/O Interface 530 can direct instructions and data from the Processor 510 and Memory 520 to the various interfaces of the I/O Bus 550. The I/O Interface 530 can also direct instructions and data from the various interfaces of the I/O Bus 550 to the Processor 510 and Memory 520. The various interfaces can comprise the Terminal Interface 552, the Storage Interface 554, the I/O Device Interface 556, and the Network Interface 558. In some embodiments, the various interfaces can comprise a subset of the aforementioned interfaces (e.g., an embedded computer system in an industrial application may not include the Terminal Interface 552 and the Storage Interface 554).

Logic modules throughout the Computer System 501—including but not limited to the Memory 520, the Processor 510, and the I/O Interface 530—can communicate failures and changes to one or more components to a hypervisor or operating system (not depicted). The hypervisor or the operating system can allocate the various resources available in the Computer System 501 and track the location of data in Memory 520 and of processes assigned to various CPUs 512. In embodiments that combine or rearrange elements, aspects of the logic modules' capabilities can be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
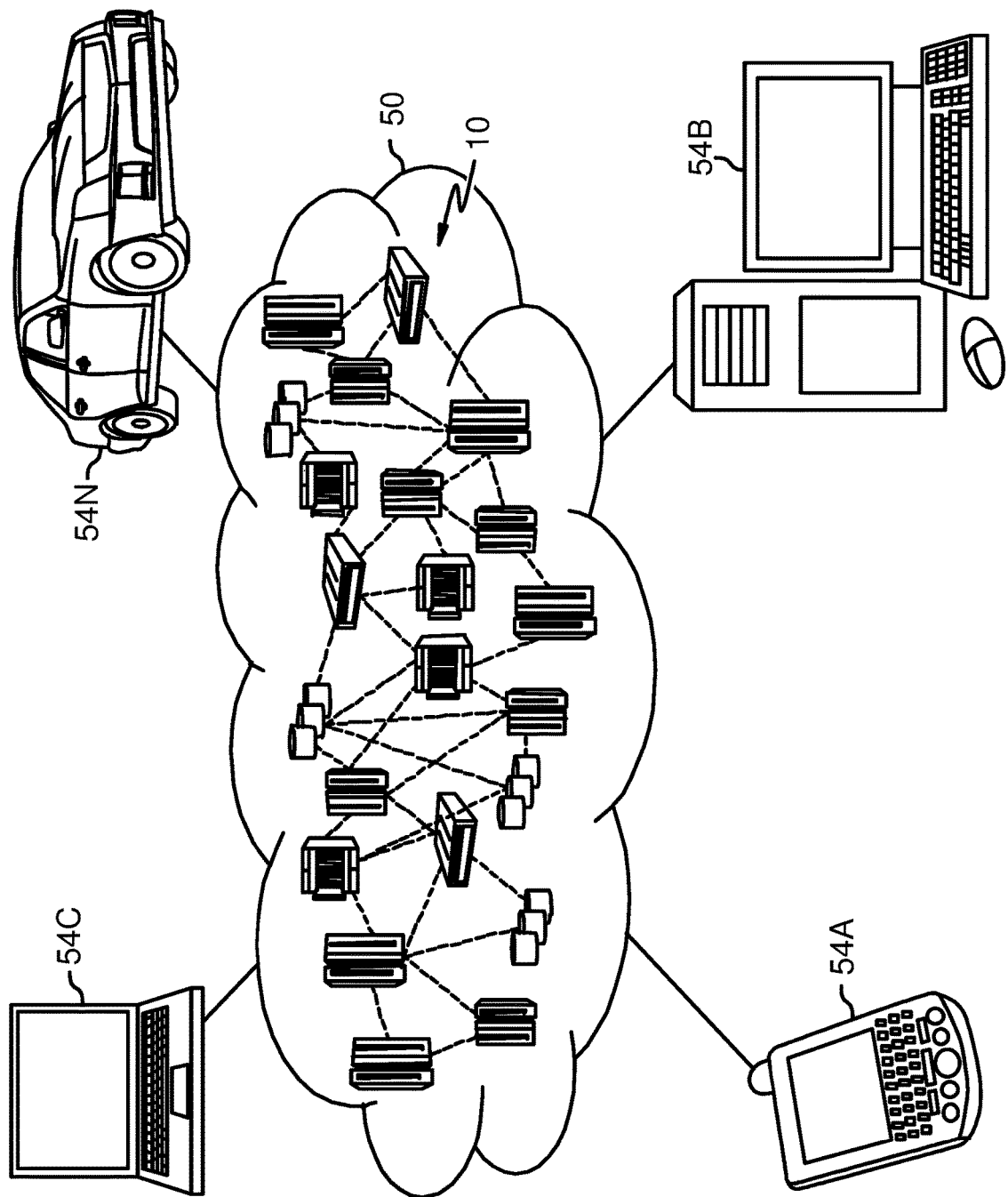
FIG. 6 depicts a cloud computing environment according to embodiments of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
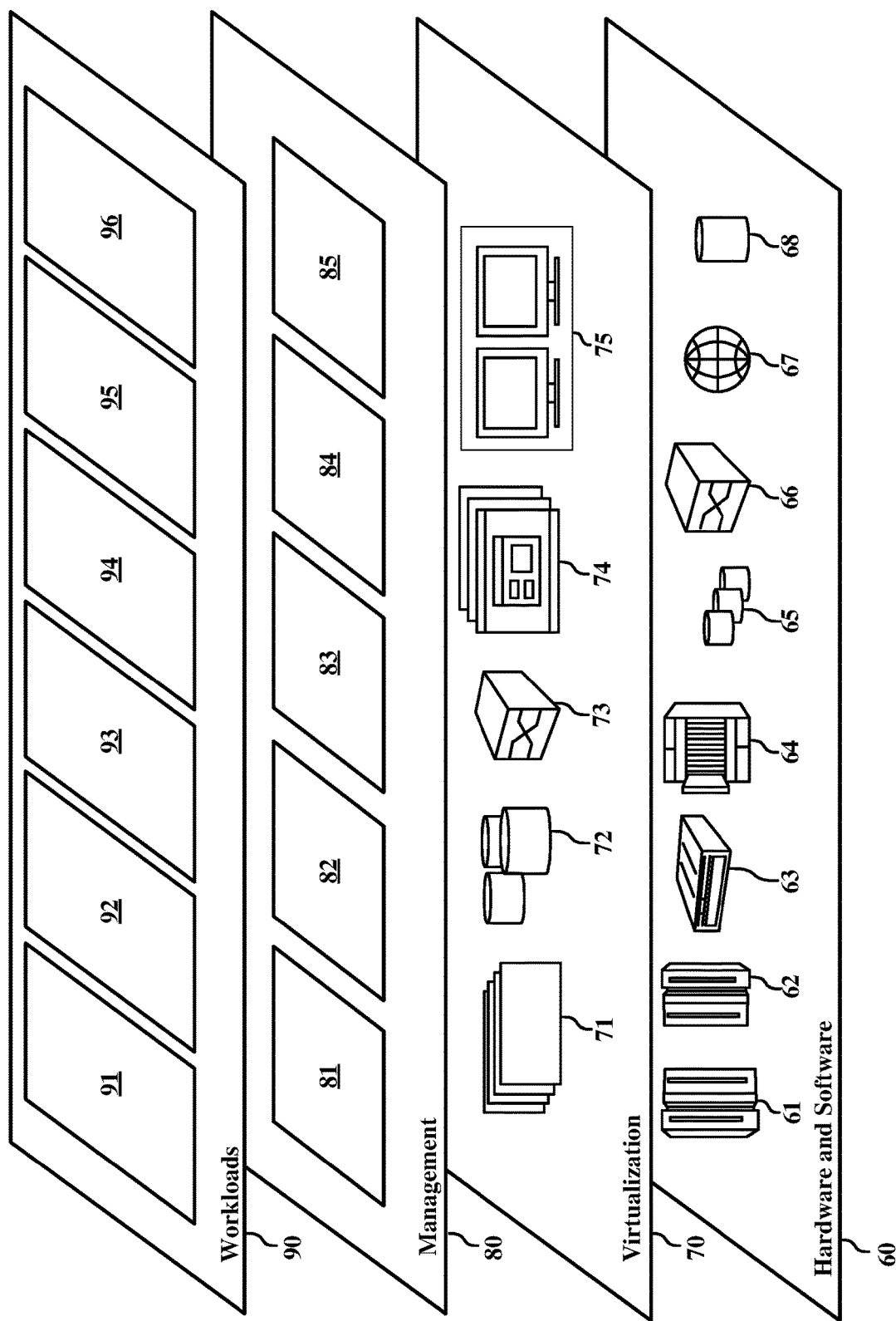
FIG. 7 depicts abstraction model layers according to embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and audio modification logic 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:
1. A computer-implemented method comprising:
obtaining audio data corresponding to a user of a communication device, the communication device configured to transmit the audio data;

obtaining proximity data indicating a user distance between the user and the communication device;
    determining that the user distance exceeds a threshold distance;
    determining, based at least in part on the audio data, an activity status of the user;
    determining that the activity status is an inactive status; and
    modifying, in response to the determining that the threshold distance is exceeded and that the activity status is the inactive status, a transmission of the audio data from the communication device, the modifying the transmission of the audio data comprising reducing a volume of the audio data transmitted from the communication device.

2. The computer-implemented method of claim 1, wherein the modifying the transmission of the audio data comprises stopping the transmission of the audio data from the communication device.

3. The computer-implemented method of claim 2, wherein the stopping the transmission of the audio data from the communication device comprises muting a microphone of the communication device.

4. The computer-implemented method of claim 1, wherein the proximity data comprises first proximity data from a first mobile device and second proximity data from a second mobile device;
    wherein the first proximity data comprises a first device distance between the first mobile device and the communication device, the first device distance indicating a first user distance between the user and the communication device;
    wherein the second proximity data comprises a second device distance between the second mobile device and the communication device, the second device distance indicating a second user distance between the user and the communication device;
    wherein the first user distance does not exceed the threshold distance; and
    wherein the second user distance exceeds the threshold distance.

5. The computer-implemented method of claim 4, further comprising transmitting a notification about the modifying to the second mobile device.

6. The computer-implemented method of claim 1, wherein the determining the activity status comprises generating, based at least in part on the audio data, an activity rating, the activity rating corresponding to the activity status of the user; and
    the determining that the activity status is the inactive status comprises determining that the activity rating does not exceed an activity threshold.

7. The computer-implemented method of claim 1, wherein the obtaining the proximity data comprises analyzing an image comprising the user.

8. The computer-implemented method of claim 1, wherein the obtaining the proximity data comprises obtaining a device distance between the communication device and a discrete mobile device.

9. The computer-implemented method of claim 8, wherein the obtaining the device distance comprises obtaining, by the communication device, a sound generated by the discrete mobile device.

10. A system comprising:
    a processor; and
    a memory in communication with the processor, the memory containing program instructions that, when executed by the processor, are configured to cause the processor to perform a method, the method comprising:
        obtaining audio data corresponding to a user of a communication device, the communication device configured to transmit the audio data;
        obtaining proximity data indicating a user distance between the user and the communication device;
        determining that the user distance exceeds a threshold distance;
        determining, based at least in part on the audio data, an activity status of the user;
        determining that the activity status is an inactive status; and
        modifying, in response to the determining that the threshold distance is exceeded and that the activity status is the inactive status, a transmission of the audio data from the communication device, the modifying the transmission of the audio data comprising reducing a volume of the audio data transmitted from the communication device.

11. The system of claim 10, wherein the modifying the transmission of the audio data comprises stopping the transmission of the audio data from the communication device.

12. The system of claim 11, wherein the stopping the transmission of the audio data from the communication device comprises muting a microphone of the communication device.

13. The system of claim 10, wherein the proximity data comprises first proximity data from a first mobile device and second proximity data from a second mobile device;
    wherein the first proximity data comprises a first device distance between the first mobile device and the communication device, the first device distance indicating a first user distance between the user and the communication device;
    wherein the second proximity data comprises a second device distance between the second mobile device and the communication device, the second device distance indicating a second user distance between the user and the communication device;
    wherein the first user distance does not exceed the threshold distance; and
    wherein the second user distance exceeds the threshold distance.

14. The system of claim 13, further comprising transmitting a notification about the modifying to the second mobile device.

15. The system of claim 10, wherein the determining the activity status comprises generating, based at least in part on the audio data, an activity rating, the activity rating corresponding to the activity status of the user; and
    the determining that the activity status is the inactive status comprises determining that the activity rating does not exceed an activity threshold.

16. A computer program product comprising a computer readable storage medium having program instructions embodied therewith, the program instructions executable by a processor to cause the processor to perform a method, the method comprising:
    obtaining audio data corresponding to a user of a communication device, the communication device configured to transmit the audio data;
    obtaining proximity data indicating a user distance between the user and the communication device;
    determining that the user distance exceeds a threshold distance;

determining, based at least in part on the audio data, an activity status of the user;

determining that the activity status is an inactive status; and modifying, in response to the determining that the threshold distance is exceeded and that the activity status is the inactive status, a transmission of the audio data from the communication device, the modifying the transmission of the audio data comprising reducing a volume of the audio data transmitted from the communication device.

17. The computer program product of claim 16, wherein the modifying the transmission of the audio data comprises stopping the transmission of the audio data from the communication device.

18. The computer program product of claim 17, wherein the stopping the transmission of the audio data from the communication device comprises muting a microphone of the communication device.

19. The computer program product of claim 16, wherein the proximity data comprises first proximity data from a first mobile device and second proximity data from a second mobile device;

wherein the first proximity data comprises a first device distance between the first mobile device and the communication device, the first device distance indicating a first user distance between the user and the communication device;

wherein the second proximity data comprises a second device distance between the second mobile device and the communication device, the second device distance indicating a second user distance between the user and the communication device;

wherein the first user distance does not exceed the threshold distance; and wherein the second user distance exceeds the threshold distance.

20. The computer program product of claim 19, further comprising transmitting a notification about the modifying to the second mobile device.

* * * * *